(12) United States Patent
Yamaguchi et al.

(10) Patent No.: US 8,587,175 B2
(45) Date of Patent: Nov. 19, 2013

(54) ROTOR OF ROTARY ELECTRIC MACHINE

(75) Inventors: Tadashi Yamaguchi, Wako (JP);
Masashi Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 77 days.

(21) Appl. No.: 13/283,591

(22) Filed: Oct. 28, 2011

(65) Prior Publication Data
US 2012/0104891 A1    May 3, 2012

(30) Foreign Application Priority Data

Nov. 1, 2010 (JP) ................. 2010-245626

(51) Int. Cl.
*H02K 1/17* (2006.01)
(52) U.S. Cl.
USPC ............. 310/156.53; 310/156.36; 310/156.38
(58) Field of Classification Search
USPC ............. 310/156.01, 156.37, 156.43–156.45, 310/156.49, 156.53–156.58, 261.1, 156.36, 310/156.38
See application file for complete search history.

(56) References Cited

U.S. PATENT DOCUMENTS 7,847,456 B2 * 12/2010 Kori et al. ............... 310/156.01
7,994,666 B2 *  8/2011 Kori et al. ............... 310/61

FOREIGN PATENT DOCUMENTS

| JP | 4244111 B2 | 5/2002 |
|---|---|---|
| JP | 2005-184957 | 7/2005 |
| JP | 2009-011011 | 1/2009 |
| JP | 2010-011640 | 1/2010 |
| JP | 2010-183800 | 8/2010 |

OTHER PUBLICATIONS

Japanese Office Action for corresponding JP Application No. 2010-245626, Oct. 23, 2012.

* cited by examiner

*Primary Examiner* — Tran Nguyen
*Assistant Examiner* — Naishadh Desai
(74) *Attorney, Agent, or Firm* — Ditthavong Mori & Steiner, P.C.

(57) ABSTRACT

A rotor of a rotary electric machine includes a rotor core and a plurality of magnetic parts. The rotor core has a plurality of slots provided along a circumferential direction. Each of the slots is separated by a center rib. The plurality of magnetic parts are disposed inside the rotor core along the circumferential direction at a predetermined interval. Each of the magnetic parts has a magnetization direction alternating with each other. Each of the magnetic parts includes a pair of permanent magnets placed inside each of the slots. The rotor core comprises a plurality of through-holes and a reinforcement rib. The plurality of through-holes each extend in an axial direction on an inner circumferential side of each of the magnetic parts. The reinforcement rib is disposed in each of the through-holes and in alignment with a circumferential center line of the center rib.

12 Claims, 4 Drawing Sheets

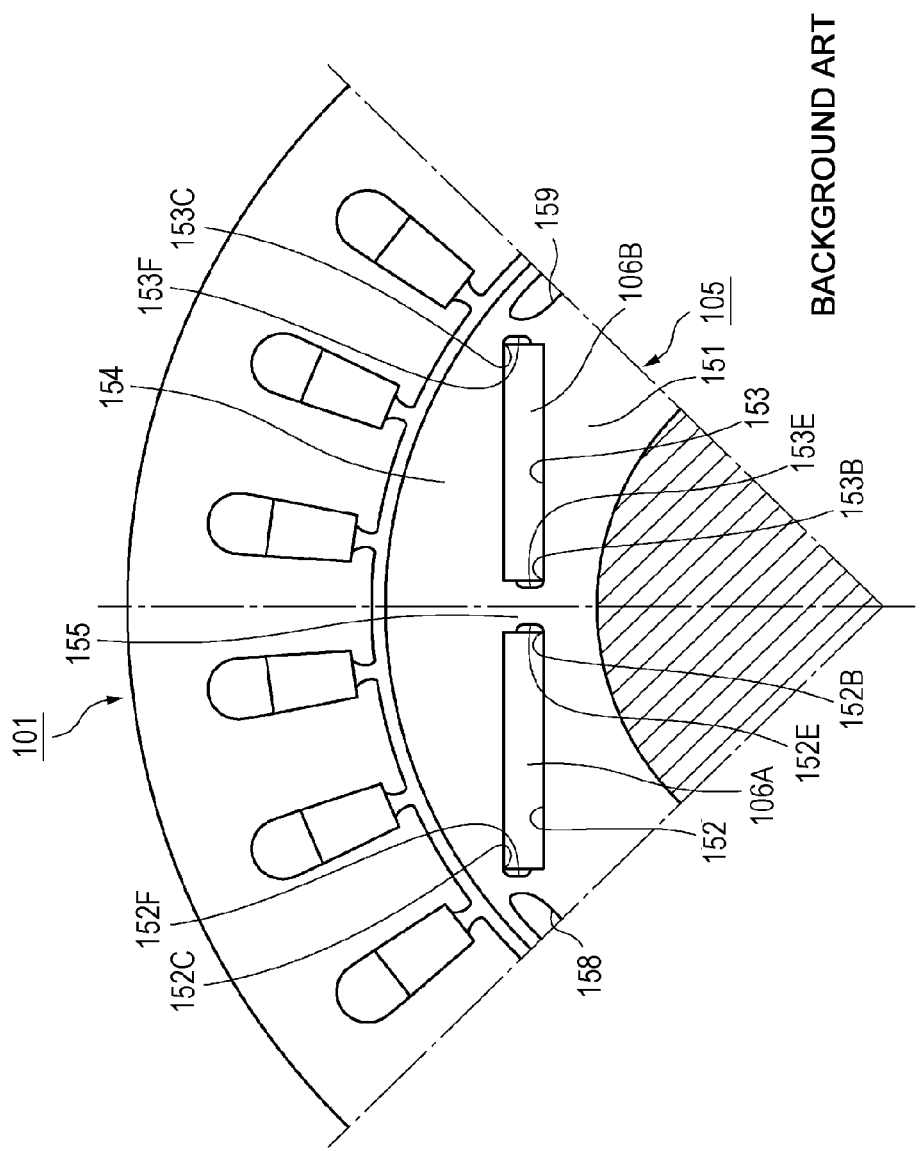

ROTOR OF ROTARY ELECTRIC MACHINE

CROSS-REFERENCES TO RELATED APPLICATIONS

The present application claims priority under 35 U.S.C. §119 to Japanese Patent Application No. 2010-245626 filed Nov. 1, 2010, entitled "Rotor of Rotary Electric Machine." The contents of this application are incorporated herein by reference in their entirety.

BACKGROUND OF THE INVENTION

1. Field of the Invention

The present invention relates to a rotor of a rotary electric machine.

2. Discussion of the Background

A known rotor of a rotary electric machine includes a rotor core, which is constituted of multi-layered annular steel plates and has slots, each in which a permanent magnet is disposed (for example, refer to Japanese Patent No. 4244111).

As illustrated in FIG. 4, a rotor 105 of a rotary electric machine according to Japanese Patent No. 4244111 includes a rotor core 151, which is constituted of limited electromagnetic steel plates disposed inside an armature 101; through-holes 158 and 159 formed in both wing parts; rectangular slots 152 and 153, which are interposed between the through-holes 158 and 159 and separated by a center part of the rotor core 151; permanent magnets 106A and 106B fit into the slots 152 and 153, respectively; a protruding pole part 154 disposed on the upper surfaces of the permanent magnets 106A and 106B; and a bridge (center rib) 155 connecting the protruding pole part 154 and the rotor core 151 between the slots 152 and 153. Stepped parts 152E and 153E, which protrude toward the bridge 155, are disposed on inner circumferential corners 152B and 153B on the bridge 155 sides of the slots 152 and 153, and stepped parts 152F and 153F, which protrude in a direction opposite to the bridge 155, are disposed on outer circumferential corners 152C and 153C on the opposite side of the bridge.

With the rotor 105 having the above-described configuration, by disposing the stepped parts 152E and 152F, 153E, and 153F in the slots 152 and 153, stress concentration due to a centrifugal force can be dispersed at the corners 152B, 152C, 153B, and 153C of the slots 152 and 153 while rotating at high speed.

SUMMARY OF THE INVENTION

According to one aspect of the present invention, a rotor of a rotary electric machine includes a rotor core and a plurality of magnetic parts. The rotor core has a rotational axis and a plurality of slots provided along a circumferential direction of the rotor core. Each of the slots is separated by a center rib. The plurality of magnetic parts are disposed inside the rotor core along the circumferential direction at a predetermined interval. Each of the magnetic parts is magnetized in a radial direction perpendicular to the rotational axis of the rotor core and has a magnetization direction alternating with each other along the circumferential direction. Each of the magnetic parts includes a pair of permanent magnets placed inside each of the slots. The rotor core comprises a plurality of through-holes and a reinforcement rib. The plurality of through-holes each extend in the rotor core in an axial direction parallel to the rotational axis on an inner circumferential side of each of the magnetic parts. The reinforcement rib is disposed in each of the through-holes and in alignment with a circumferential center line of the center rib

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 4 is a front view of essential parts of a known rotor.

DESCRIPTION OF THE EMBODIMENTS

Figure 1:
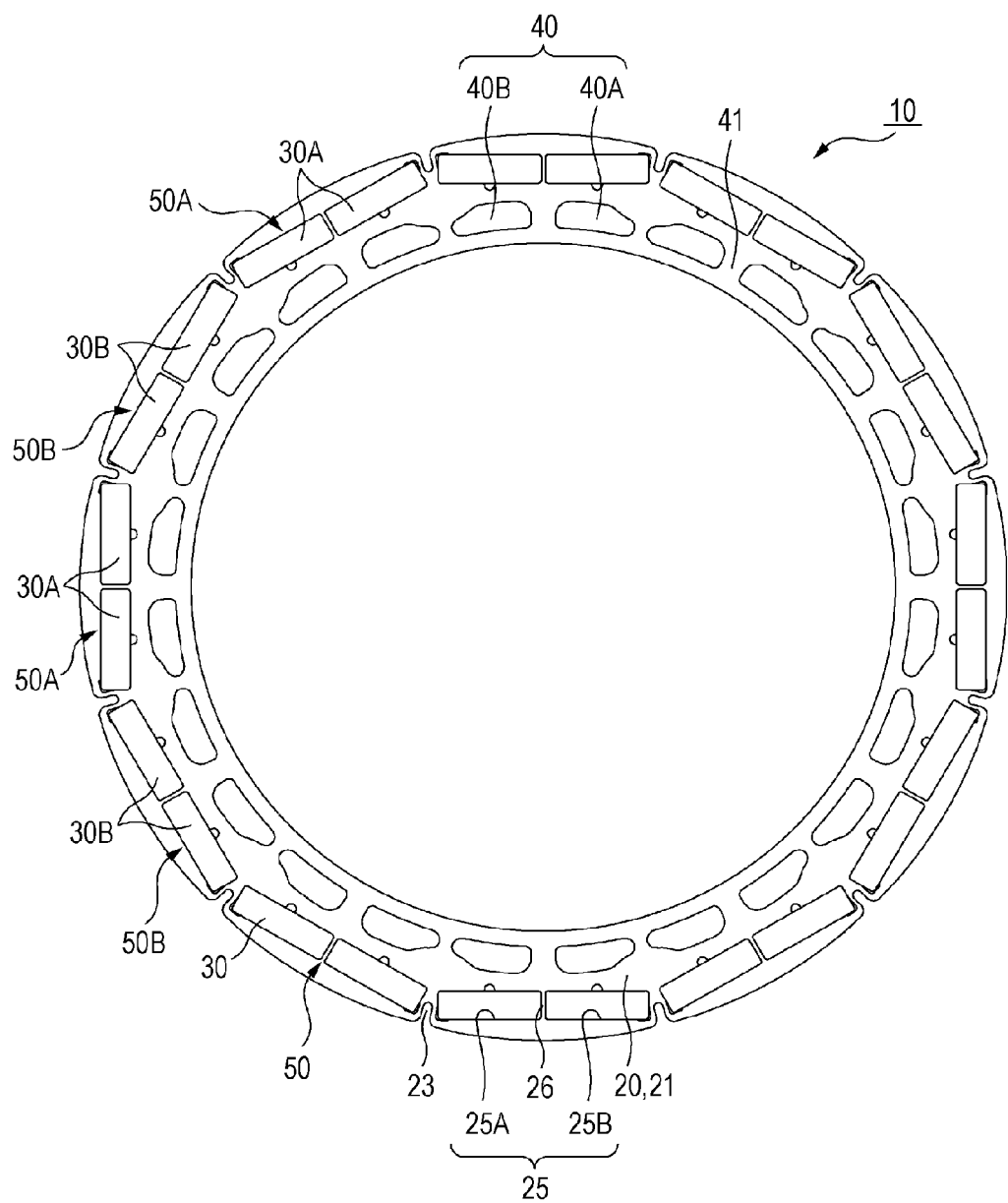
FIG. 1 is a front view of a rotor according to an embodiment of the present invention.

The embodiments will now be described with reference to the accompanying drawings, wherein like reference numerals designate corresponding or identical elements throughout the various drawings.

A rotor of a rotary electric machine according to an embodiment of the present invention will be described in detail below with reference to FIGS. 1 and 2. The drawings are viewed in the direction corresponding to the reference numerals.

A rotor 10 of a rotating electric machine according to this embodiment is disposed on the inner circumferential side of a stator (not shown) and includes a rotor core 20 that is attached to the outer circumferential side of a substantially cylindrical rotor shaft (not shown), which is a rotary shaft, and magnetic parts 50 disposed inside the rotor core 20 along the circumferential direction at equal intervals.

The rotor core 20 includes multiple layers of annular electromagnetic steel plates of substantially the same shape, e.g., silicon steel plates 21. The outer circumference of the rotor core 20 has substantially U-shaped grooves 23 provided at predetermined intervals. Rectangular slots 25, i.e., each including first and second sub-slots 25A and 25B, are interposed between adjacent grooves 23.

A center rib 26 separates each of the slots 25 into the first sub-slot 25A and the second sub-slot 25B, which are substantially symmetrically about the center rib 26, and extends in the radial direction at the circumferential middle area of the slot 25.

The magnetic parts 50 are magnetized in the radial direction such that opposite poles alternate along the circumferential direction. Each magnetic part 50 includes a pair of permanent magnets 30 placed inside the slot 25. Specifically, the pair of permanent magnets 30 is placed inside the slot 25 such that, when the outer circumferential side of a magnetic part 50A, which is constituted of a pair of permanent magnets 30A placed inside the slot 25, is the N pole, the outer circumferential side of a magnetic part 50B adjacent to the magnetic part 50B, which is constituted of a pair of permanent magnets 30B placed inside the slot 25, across the groove 23 is the S pole.

Figure 2:
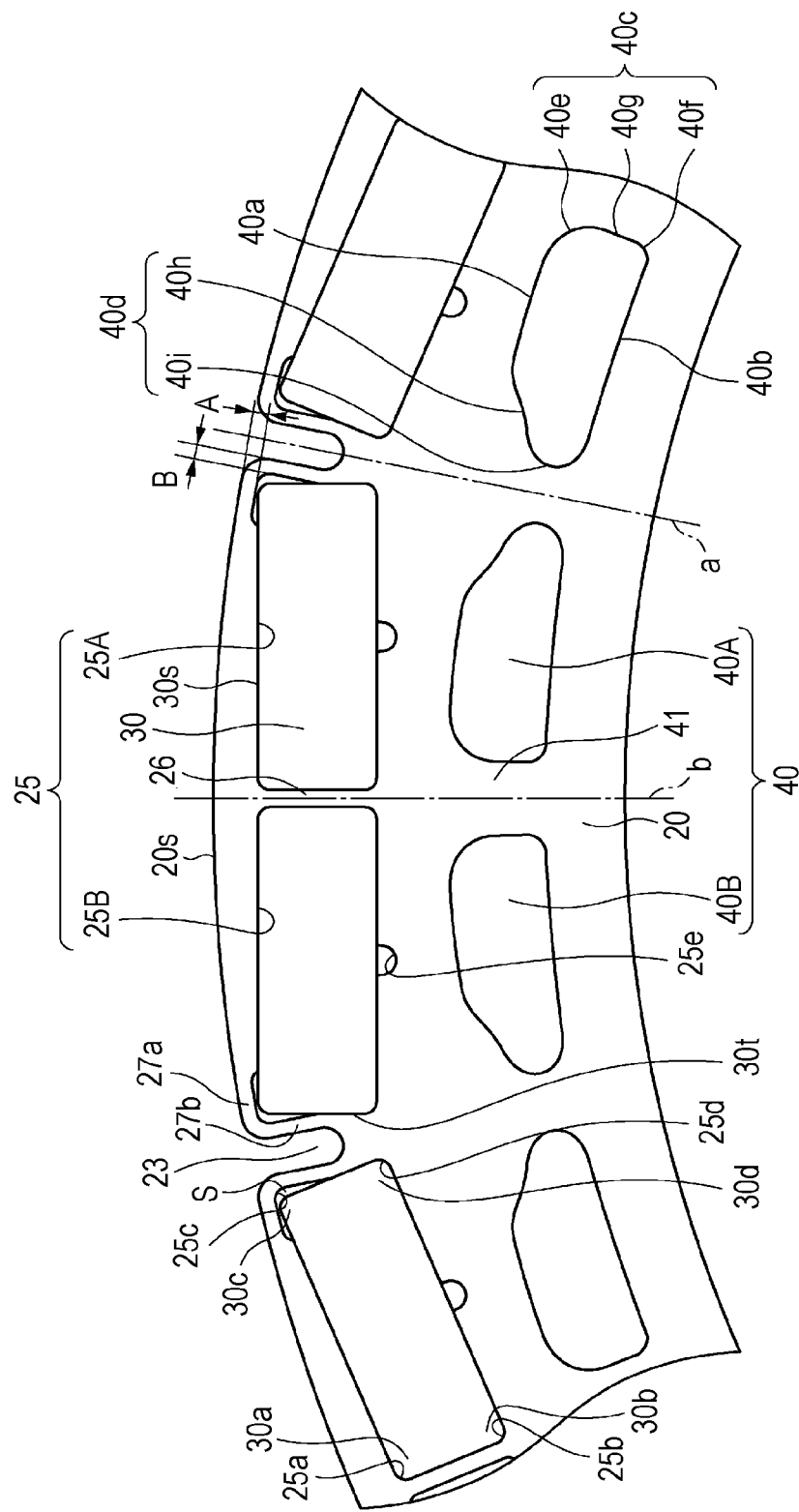
FIG. 2 is a partially enlarged view of the rotor in FIG. 1.

As illustrated in FIG. 2, with the permanent magnets 30 placed inside the slot 25, outer circumferential corners 25c of the slot 25 close to the grooves 23 protrude further than outer circumferential corners 30c of the permanent magnets 30 in the radial and circumferential directions. As a result, a gap S is formed between each pair of the outer circumferential corners 25c and 30c. The gap S extends along an outer-radial end surface 30s of each of the permanent magnets 30 and a circumferential end surface 30t on the groove 23 side of the same permanent magnet 30. Since the gap S is formed between the outer circumferential corners 25c of the slot 25 and the outer circumferential corners 30c of the permanent magnets 30, the outer circumferential corners 25c and 30c are prevented from contacting each other, preventing stress concentration caused by a centrifugal force generated by the rotating rotor.

A resin filling hole 25e is a substantially semicircular hole in which resin is filled to secure the permanent magnet 30 by pressing it against the slot 25 from the inner radial side.

The slot 25 is substantially the same shape as the permanent magnets 30, except for the outer circumferential corners 25c and the resin filling holes 25e. Since the permanent magnets 30 are positioned in the circumferential and radial directions by making the permanent magnets 30 and the slot 25 contact each other at inner circumferential corners 30d and 25d on the groove 23 side and outer circumferential corners 30a and 25a and inner circumferential corners 30b and 25b at the circumferentially middle area of the slot 25, vibration of the permanent magnets 30 can be prevented while the rotor is rotating.

Each of the grooves 23 is shaped symmetrically about an imaginary line a, which extends in the radial direction through the circumferentially middle area, and is positioned such that, with the paired permanents 30 placed inside the slot 25, the innermost part (deepest part) is positioned closer to the inner circumference of the rotor core 20 than the outermost parts of the permanent magnets 30 and closer to outer circumference of the rotor core 20 than the inner circumferential surfaces of the permanent magnets 30. The grooves 23 are not limited to substantially U-shaped grooves, such as those illustrated in FIGS. 1 and 2, but may be substantially semicircular, substantially V-shaped, or substantially rectangular.

Since the rotor core 20 has the gaps S and the grooves 23, a circumferential rib 27a is formed between each gap S and each outer circumferential surface 20s of the rotor core 20, and a radial direction rib 27b is formed between each gap S and each groove 23. By providing the circumferential rib 27a and the radial direction rib 27b, magnetic saturation occurs easily at the ribs 27a and 27b, preventing a decrease in torque due to magnetic flux shunting between adjoining opposite poles. The radial width A of the radial circumferential rib 27a in the radial direction and the circumferential width B of the radial direction rib 27b in the circumferential direction are set to prevent a decrease in torque caused by magnetic flux shunting between adjoining opposite poles, as well as a decrease in fatigue strength against stress caused by a centrifugal force generated by rotation. In this embodiment, the radial width A of the radial circumferential rib 27a and the circumferential width B of the radial direction rib 27b are substantially the same.

The rotor core 20 has a through-hole 40, which includes first and second sub-through-holes 40A and 40B, penetrating the rotor core 20 in the axial direction at positions closer to the inner circumference than the magnetic parts 50.

Consequently, the weight of the rotor core 20 can be reduced compared with the weight of a known rotor core 151, which is illustrated in FIG. 4, and thus, reducing stress due to a centrifugal force generated by the weight of the rotor core 20.

A reinforcement rib 41 is disposed in the circumferentially middle area of the through-hole 40 and extends in the radial direction in alignment with the circumferential center line b of the center rib 26. The reinforcement rib 41 separates the through-hole 40 into the first and second sub-through-holes 40A and 40B, which are symmetrical about the reinforcement rib 41. The reinforcement rib 41 is disposed substantially parallel to the center rib 26 on the inner circumferential side of the center rib 26, such that the circumferential center line of the reinforcement rib 41 is substantially aligned with the circumferential center line b of the center rib 26.

Figure 3:
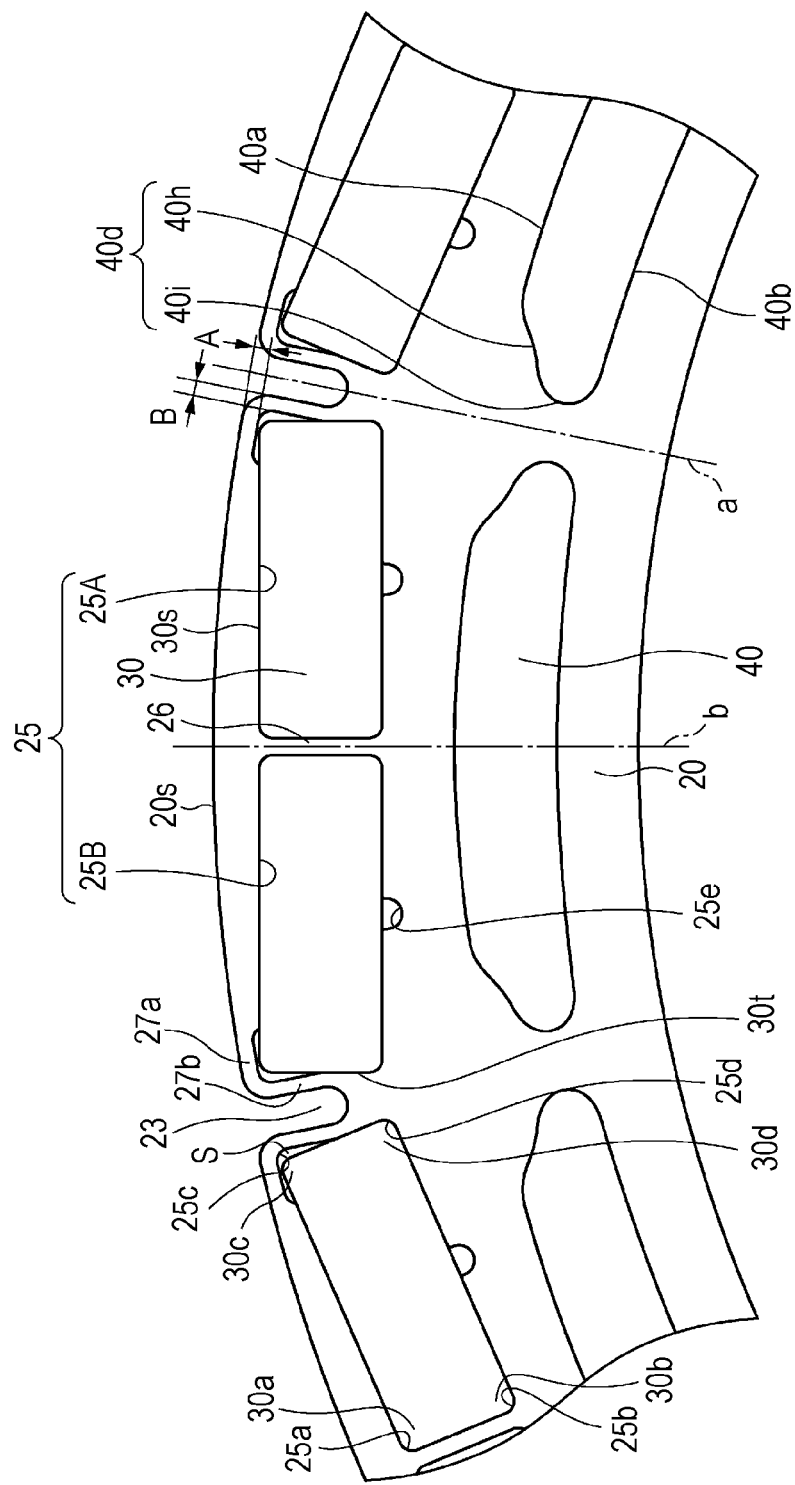
FIG. 3 is a partially enlarged view of a rotor according to a reference example, which does not include a reinforcement rib.

Since the center rib 26 and the reinforcement rib 41 are respectively disposed in the circumferentially middle areas of the slot 25 and the through-hole 40, the rigidity of the rotor core 20 against tensile stress acting upon the rotor core 20 in the radial direction can be increased, compared with a rotor core 20, such as that illustrated in FIG. 3, not including a reinforcement rib 41. Thus, deformation of the rotor core 20 caused by tensile stress acting upon the rotor core 20 in the radial direction due to a centrifugal force generated by the permanent magnets 30 can be prevented, stress concentration at the rotor core 20 and be reduced and dispersed. In particular, there is a great effect in reducing stress generated at the outer circumferential corner 25a and the inner circumferential corners 25b close to the circumferentially middle areas, the outer circumferential corners 25c close to the grooves 23, and the resin filling holes 25e of the slot 25 in the rotor core 20, which is prone to stress concentration. Since the reinforcement rib 41 is disposed substantially parallel to the center rib 26 on the inner circumferential side of the center rib 26, such that the circumferential center line b of the center rib 26 is substantially aligned with the circumferential center line of the reinforcement rib 41, rigidity of the rotor core 20 can be effectively increased against tensile stress acting upon the rotor core 20 in the radial direction.

For the entire reinforcement rib 41, the width of the reinforcement rib 41 in the circumferential direction is set larger than the width of the center rib 26 in the circumferential direction, along the entire reinforcement rib 41. The width of the center rib 26 in the circumferential direction is set small so as to promote magnetic saturation in the center rib 26 to prevent shunting of a magnetic flux, through the center rib 26, from one of the inner circumferential surface and the outer circumferential surface of one of the paired permanent magnets 30, constituting a pair of magnetic parts 50, to the other one of the inner circumferential surface and the outer circumferential surface of the permanent magnet 30. The width of the reinforcement rib 41 in the circumferential direction is larger than the width of the center rib 26 in the circumferential direction so as to improve the rigidity of the rotor core 20. The width of the center rib 26 in the circumferential direction is set to improve the rigidity of the rotor core 20 and to reduce the weight of the rotor core 20 by forming the through-hole 40.

Each of the sub-through-hole 40A and 40B is defined by an outer-circumferential end surface 40a and an inner-circumferential end surface 40b, which are substantially parallel to the outer circumferential surface 20s of the rotor core 20; a circumferential center part 40c, which connects the ends of the end surfaces 40a and 40b close to the circumferentially middle area; and a circumferential end section 40d, which connects the ends of the end surfaces 40a and 40b close to the circumferentially outward areas.

The inner-circumferential end surface 40b extends further toward the circumferentially outward areas (toward the imaginary line a) than the outer-circumferential end surface 40a. The circumferential center part 40c defines the reinforcement rib 41 and includes a substantially arc-shaped outer circumferential corner 40e, a substantially arc-shaped inner circumferential corner 40f, and a circumferential side surface 40g, which connects the outer circumferential corner 40e and the inner circumferential corner 40f and extends in the radial direction.

The circumferential end section 40d of each sub-through-hole 40A and 40B includes a substantially arc-shaped outer circumferential depression 40h, which is depressed in the inner circumferential direction, and a substantially semi-circular inner circumference protrusion 40i, which protrudes outward in the circumferential direction (toward the imaginary line a). The width of the circumferential end section 40d between the corresponding permanent magnet 30 and the corresponding sub-through-hole 40A or 40B in the radial direction becomes larger in the direction from the circumferentially middle area to a circumferential end section of the slot 25. With this structure, the flow of the magnetic flux generated at the inner circumferential surface of a permanent magnet 30 of one of the magnetic parts 50 to the inner circumferential surface of the magnetic 30 of the other magnetic part 50 across the corresponding groove 23 is not interrupted, and magnetic resistance is reduced at the rotor core 20, increasing rotary torque.

In the through-hole 40, the radius of curvature of the outer circumferential corner 40e of the circumferential center part 40c is set smaller than that of the inner circumferential corner 40f. Consequently, while the rotor is rotating, stress can be effectively reduced at the outer circumferential corner 40e, where the radial distance from the rotary shaft is large, and stress caused by to a centrifugal force due to the weight of the rotor core 20 is larger.

With the rotor 10 of the rotary electric machine according to the embodiment described above, since the through-holes 40, which penetrate the rotor core 20 in the axial direction, are formed in the rotor core 20 on the inner diameter side of the magnetic parts 50, the weight of the rotor core 20 is reduced, and a predetermined rotary torque can be output at a low electric current. Since the weight of the rotor core 20 is reduced, the centrifugal force of the rotor core 20 is reduced, and the stress generated at the rotor core 20 is reduced. Accordingly, the strength of the rotor core 20 can be maintained.

In particular, since the slot 25 has the center rib 26, and the through-hole 40 has the reinforcement rib 41, which is aligned with the center line b of the center rib 26, the rigidity of the rotor core 20 against tensile stress in the outer circumferential direction due to a centrifugal force of the permanent magnets 30, is increased, and stress concentration at the rotor core 20 can be reduced and dispersed. In this way, the stress generated at the rotor core 20, or in particular, stress generated at the outer circumferential corner 25a and the inner circumferential corner 25b closer to the circumferentially middle area of the slot 25, the outer circumferential corner 25c on the groove 23 side, and the resin filling hole 25e can be reduced, enabling the strength of the rotor core 20 to be maintained.

With the rotor 10 of the rotary electric machine according to this embodiment, since the width of the center rib 26 in the circumferential direction is set larger than the width of the reinforcement rib 41 in the circumferential direction, magnetic saturation easily occurs at the center rib 26, reducing the magnetic flux shunting from one of the magnetic pole surfaces of the permanent magnet 30 to the other magnetic pole surface of the opposite pole, and improving the rigidity of the rotor core 20.

With the rotor 10 of the rotary electric machine according to this embodiment, since the through-hole 40 has the circumferential end section 40d, whose width in the radial direction in the direction from the corresponding permanent magnet 30 to the through-hole 40 increases in the direction from the circumferentially middle area to each circumferential end section of the slot 25, the magnetic flux generated at the permanent magnet 30 is less likely to be interrupted by the through-hole 40, and the magnetic resistance of the rotor core 20 between the slot 25 and the through-hole 40 is reduced, improving the rotary torque.

With the rotor 10 of the rotary electric machine according to this embodiment, since the outer circumferential corner 40e and the inner circumferential corner 40f of the circumferential center part 40c of the through-hole 40 are substantially arc-shaped, and the radius of curvature of the outer circumferential corner 40e is set smaller than that of the inner circumferential corner 40f, stress can be effectively reduced at the outer circumferential corner 40e, where the distance from the rotary shaft center in the radial direction is large and stress caused by a centrifugal force due to the weight of the rotor core 20 is larger.

The rotor 10 of the rotary electric machine according to the present invention is not limited to the embodiment described above, and various changes and modifications may be made appropriately.

For example, at least one rib, which extends in the radial direction and further separates each of the first and second through-holes 40A and 40B along the circumferential direction, may be disposed in the through-hole 40. In such a case, the number, position, size of the ribs are determined so that the rigidity of the rotor core 20 is improved and the weight of the rotor core 20 is reduced.

The embodiment of the present invention provides a rotor of a rotary electric machine (for example, a rotor 10 of a rotary electric machine in the embodiment) includes a rotor core (for example, a rotor core 20 in the embodiment); and a plurality of magnetic parts (for example, a magnetic part 50 in the embodiment) disposed inside the rotor core along the circumferential direction at predetermined intervals, wherein the magnetic parts are magnetized in the radial direction, and the magnetization direction of the magnetic parts alternates along the circumferential direction, each of the magnetic parts includes paired permanent magnets (for example, permanent magnets 30 in the embodiment) placed inside a slot (for example, a slot 25 in the embodiment) separated by a center rib (for example, a center rib 26 in the embodiment), a through-hole (for example, a through-hole 40 in the embodiment) penetrates the rotor core in the axial direction on the inner circumferential side of each of the magnetic parts, and a reinforcement rib (for example, a reinforcement rib 41 in the embodiment) is disposed in the through-hole and in alignment with a circumferential center line (for example, a circumferential center line b in the embodiment) of the center rib.

With the embodiment of the present invention, since the through-hole that penetrates the rotor core in the axial direction is formed on the inner circumferential side of the magnetic part, the weight of the rotor core is reduced, and a predetermined rotary torque can be output at a low electric current. Since the weight of the rotor core is reduced, the centrifugal force of the rotor core is reduced, and stress generated at the rotor core is reduced, maintaining the strength of the rotor core. Since the center rib is disposed in the slot, and the reinforcement rib is disposed in the through-hole in alignment with the circumferential center line of the center rib, the rigidity of the rotor core against tensile stress generated in the outer circumferential direction due to the centrifugal force of the permanent magnets is increased, and stress concentration is reduced and dispersed. Accordingly, the stress generated at the rotor core, or in particular, the stress generated at the corners of the slots in the rotor core can be reduced, maintaining the strength of the rotor core.

In the embodiment, the width of the reinforcement rib in the circumferential direction may be larger than the width of the center rib in the circumferential direction.

According to the embodiment, since the width of the reinforcement rib in the circumferential direction is larger than the width of the center rib in the circumferential direction, magnetic saturation easily occurs at the center rib, reducing the magnetic flux shunting from one of the magnetic pole surfaces of the permanent magnet to the other magnetic pole surface of the opposite pole, and improving the rigidity of the rotor core.

In the embodiment, a circumferential end section (for example, a circumferential end section 40d in the embodiment) of the through-hole may be disposed so as to increase the width from one of the permanent magnets to the through-hole in the radial direction, along a direction from a circumferentially middle area of the slot to a circumferential end section of the slot.

According to the embodiment, since the through-hole has the circumferential end section, whose width in the radial direction in the direction from the corresponding permanent magnet to the through-hole increases in the direction from the circumferentially middle area to each circumferential end section of the slot, the magnetic resistance of the rotor core between the slot and the through-hole can be reduced with respect to the magnetic flux generated at the inner circumferential surface of the permanent magnets in the magnetized parts, and the rotary torque can be improved.

In the embodiment, an outer circumferential corner (for example, an outer circumferential corner 40e in the embodiment)and an inner circumferential corner (for example, an inner circumferential corner 40f in the embodiment)of the circumferentially middle area (for example, a circumferential center part 40c in the embodiment) of the through-hole may be substantially arc-shaped, and the radius of curvature of the outer circumferential corner may be smaller than the radius of curvature of the inner circumferential corner.

According to the embodiment, since the radius of curvature of the outer circumferential corner may be smaller than the radius of curvature of the inner circumferential corner, the stress at the outer circumferential corner, where the distance from the rotary center in the radial direction is large, can be reduced at the outer circumferential corner receiving a large stress due to a centrifugal force.

Obviously, numerous modifications and variations of the present invention are possible in light of the above teachings. It is therefore to be understood that within the scope of the appended claims, the invention may be practiced otherwise than as specifically described herein.

What is claimed is:

1. A rotor of a rotary electric machine, comprising:
    a rotor core having a rotational axis and a plurality of slots provided along a circumferential direction of the rotor core, each of the slots being separated by a center rib provided in a circumferentially middle area of each of the slots;
    a plurality of magnetic parts disposed inside the rotor core along the circumferential direction at a predetermined interval, each of the magnetic parts being magnetized in a radial direction perpendicular to the rotational axis of the rotor core and having a magnetization direction alternating with each other along the circumferential direction, each of the magnetic parts including a pair of permanent magnets placed inside each of the slots, the pair of permanent magnets being provided parallel to each other; and
    the rotor core comprising:
        a plurality of through-holes each extending in the rotor core in an axial direction parallel to the rotational axis, the through-holes being spaced apart from each other and provided on an inner circumferential side of each of the magnetic parts at circumferential positions respectively corresponding to the magnet parts; and
        a reinforcement rib disposed to separate each of the through-holes into a first sub-through-hole and a second sub-through-hole and disposed in alignment with a circumferential center line of the center rib, an outer-circumferential end surface of each of the first and second sub-through-holes being provided on a common circle having a center provided on the rotational axis of the rotor core.

2. The rotor of a rotary electric machine according to claim 1, wherein a width of the reinforcement rib in the circumferential direction is larger than a width of the center rib in the circumferential direction.

3. The rotor of a rotary electric machine according to claim 1, wherein, in a vicinity of a circumferential end section of the through-hole, a width between one of the permanent magnets and the through-hole in the radial direction increases along a direction from a circumferentially middle area of the slot to a circumferential end section of the slot.

4. The rotor of a rotary electric machine according to claim 1, wherein an outer circumferential corner and an inner circumferential corner of a circumferentially middle area of the through-hole are substantially arc-shaped, and a radius of curvature of the outer circumferential corner is smaller than a radius of curvature of the inner circumferential corner.

5. The rotor of a rotary electric machine according to claim 1, wherein an outer circumference of the rotor core has a plurality of grooves, each of the plurality of grooves is provided at a predetermined interval with each other, and each of the slots is provided between two of the grooves adjacent to each other.

6. The rotor of a rotary electric machine according to claim 1,
    wherein the first sub-through-hole includes a first circumferential end connected with the outer-circumferential end surface of the first sub-through-hole,
    wherein the second sub-through-hole includes a second circumferential end connected with the outer-circumferential end surface of the second sub-through-hole,
    wherein the first circumferential end extends radially inward from the circle and extends to be closer to the rotational axis of the rotor core as being closer to the first circumferential end from the circumferentially middle area of each of the slots along the circumferential direction, and
    wherein the second circumferential end extends radially inward from the circle and extends to be closer to the rotational axis of the rotor core as being closer to the second circumferential end from the circumferentially middle area of each of the slots along the circumferential direction.

7. The rotor of a rotary electric machine according to claim 6,
    wherein the first circumferential end includes a substantially arc-shaped outer circumferential depression protruding radially inward, and wherein the second circumferential end includes a substantially arc-shaped outer circumferential depression protruding radially inward.

8. The rotor of a rotary electric machine according to claim 1,
wherein the rotor core includes grooves each provided on an outer circumference of the rotor core and between the slots in the circumferential direction,
wherein outer circumferential corners of the slots close to the grooves protrude further than outer circumferential corners of the permanent magnets in the circumferential direction and in a radial direction of the rotor,
wherein gaps are defined between the outer circumferential corners of the slots and outer circumferential corners of the permanent magnets,
wherein the rotor core includes circumferential ribs and radial direction ribs,
wherein the circumferential ribs are provided between gaps and an outer circumferential surface of the rotor core and extends in the circumferential direction, and
wherein the radial direction ribs are provided between the gaps and grooves and extends in the radial direction of the rotor core.

9. A rotor of a rotary electric machine, comprising:
a rotor core having a rotational axis and a plurality of slots provided along a circumferential direction of the rotor core, each of the slots being separated by a center rib provided in a circumferentially middle area of each of the slots;
a plurality of magnetic parts disposed inside the rotor core along the circumferential direction at a predetermined interval, each of the magnetic parts being magnetized in a radial direction perpendicular to the rotational axis of the rotor core and having a magnetization direction alternating with each other along the circumferential direction, each of the magnetic parts including a pair of permanent magnets placed inside each of the slots, the pair of permanent magnets being provided parallel to each other; and
the rotor core comprising:
a first sub-through-hole and a second sub-through-hole extending in the rotor core in an axial direction parallel to the rotational axis, the first and second sub-through-holes being provided on an inner circumferential side of each of the magnetic parts at circumferential positions respectively corresponding to the magnet parts; and
a reinforcement rib disposed between the first and second sub-through-holes.

10. The rotor of a rotary electric machine according to claim 9, wherein an outer-circumferential end surface of each of the first and second sub-through-holes being provided on a common circle having a center provided on the rotational axis of the rotor core.

11. The rotor of a rotary electric machine according to claim 9, wherein the reinforcement rib is disposed in alignment with a circumferential center line of the center rib.

12. The rotor of a rotary electric machine according to claim 11, wherein an outer-circumferential end surface of each of the first and second sub-through-holes being provided on a common circle having a center provided on the rotational axis of the rotor core.

* * * * *